Figure 2:
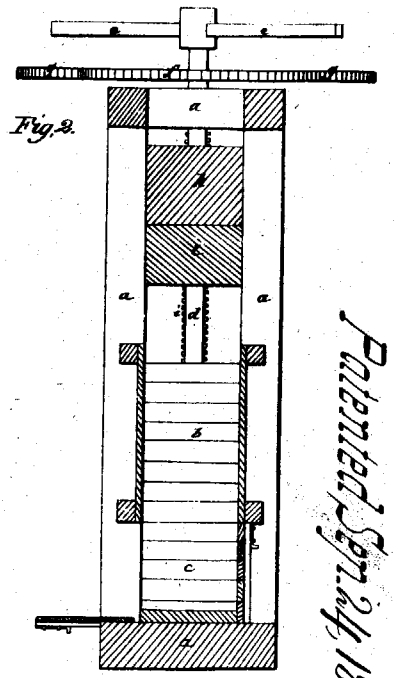
Figure 1:
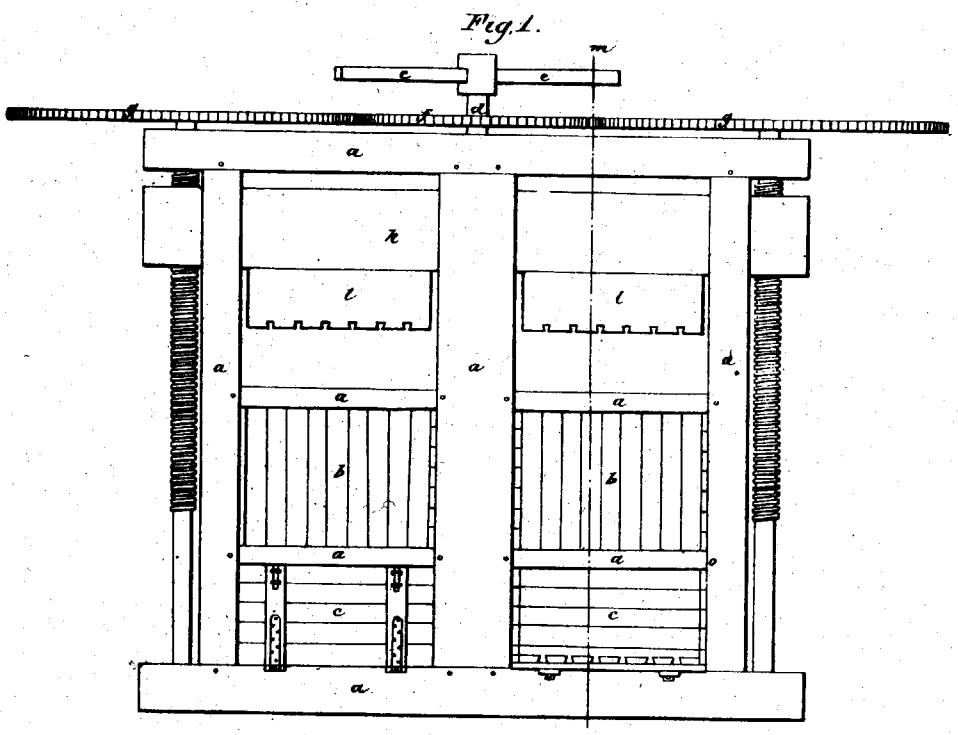

No Printed Specification Available

400X

J. Idler,

Cotton Press.

Patented Sep. 24, 1802.

400X Jacob [illegible] Sept. 24, 1802

Letters Patent Dated Sep. 24. 1802.

The Schedule referred to in these Letters Patent and making part of
the same containing a description in the words of the said Jacob [illegible]
himself of his improvement. Being a Machine for pressing cotton or
other Bale Goods Description of certain improvements of presses by Jacob [illegible] for
pressing one or two bales of cotton or other Bales of goods at one pressing
as follows. 1st. A press acting by two screws and wheels in a large frame.
A wheel is fastened on the head of every screw. The two screws are to stand
perpendicular in the large frame. A follower is fitted in the large frame
with two pressing blocks fastened to it. The two screws are fitted thro'
the follower and [illegible] the boxes fastened in the follower. The two wheels
and screws are set in motion by a small wheel fitted between or on the side
of the large wheels. A shaft is fitted in the shaft of the small wheel &
there are levers fitted in the shaft of the small wheel which turn the
small wheel and sets the two large wheels and screws in motion which
move the follower up and down. The box in which the cotton or bale
goods are pressed are of great consequence in a packing machine of this or
any other kind in pressing cotton or bale goods. The Boxes for this purpose
standing boxes, or boxes which are fastened to the large frame and in each of
these boxes are to be moved when cotton or other bale goods are pressed
in them except the end pieces and the lower or under boxes which are fix-
ed to the slide under the standing frame or boxes. The standing boxes are
fastened to the large frame by four cross beams. two of which are fastened on
each side of the large frame and placed at a certain distance apart accord-
ing to the height of the large frame. There are likewise six upright posts
or studs three on each side of the middle piece which is a size larger than
either of the others. and divides the standing boxes and is framed perpendicular-
ly in the lower cross beams and [illegible] through the upper cross beams
[illegible] of the follower. The distance of these uprights [illegible]

posts from each other depend upon the size of the bale or mass of [illegible]
to receive the end pieces at each end of the [illegible] Boxes. as high up as the
pressing blocks. The end pieces may be of any size and number required
There are two doors placed in front of the standing Boxes, one to each [illegible]
or box for putting in cotton or bale goods. and the remainder of the [illegible]
are filled up from the top. As the follower presses down the end pie
ces above mentioned are to be drawn out to make way for the follow[illegible]
til it arrives at the lower Boxes. The lower Boxes may be single or con
sist of two placed on each other. which may be kept steady by iron
pins or otherwise. The lower boxes are to be kept in their places un
der the standing frame by bolts &c. They open on both sides by
means of hinges staples drawing bolts &c. 2nd. A press acting
by racks. The large frame in which the racks do act in are nearly the
same as above described. The two racks are fastened each into a beam
or may be used by themselves. The racks and beams pass through
the upper beam of the frame. The lower parts of the two racks are
keyed or bolted fast to the follower. There is a large [illegible] or cast
iron or wood spindle which runs across the large frame and the two
racks. one end of the spindle runs in a box bolted on the opposite [illegible]
of the large frame. There are two small wheels or nuts fitted on the
spindle to fit and work with the two racks. There are four [illegible] fitted
on the upper beam of the large frame. one on each side of the small
wheel or nut on which the spindle works. on one end of the spindle
there is a large bevel gear wheel and a small wheel fitted in a [illegible]
[illegible] on the larger one. This machine can be set in motion by a
walking crane. A small ratchet wheel is fitted on the shaft of the
small wheel is on the walking crane to keep the racks &c from going back
This machine can be set in motion by the addition of other wheels & shafts
by steam horses or any other power. The boxes which are described above m[illegible]
be used by this — 3. A press acting by a single rack for pressing cotton or
any other bale goods. The large frame for this machine is similar to that [illegible]
[illegible] different [illegible]
[illegible]

460X is used on the spindle or a small wheel fitted to act on the rack and on one end
of the spindle is a large wheel and a small wheel or nut is fitted on a shaft to act
on the large wheel and a [illegible] wheel is fixed on the same shaft to keep it
in its place. The spindle runs in boxes on both sides and in the large frame
two other boxes are placed one on each side of the small wheel which works in
the rack. The rack is made to act end and side ways in the following manner.
The rack is fitted in the frame end or side ways, there is a small wheel to act
~~[illegible]~~
side ways on the large wheel fastened [illegible] small wheel is fastened on
another shaft to act on the large wheel and sets the whole in motion. And
to increase the power there can be another small and large wheel fitted on a shaft
to work in the aforesaid wheels. A double [illegible] wheel is fastened on the
side of the shafts to keep the rack and machinery in their proper places by pres-
sing &c. The rack is fastened to the follower in different ways.
1st A Press which has four boxes standing on the top of each other for pressing
cotton or any other bale goods. The boxes may be of any size required. The under
box opens in front and back by means of hinges. The second box has two end
pieces, these end pieces have hinges on both ends with a [illegible] in each end fit
into staples which are placed on the front and back part of the box, and the
follower presses down the end pieces are taken off to let the follower pass
the remainder of the box is taken off by means of hinges and [illegible] bolts
on both sides. The end pieces may be of any size according to the size of
the boxes. The box is strengthened by a triangular bow of iron in the mid-
dle or any other shape. The third box is made in the same manner as the sec-
ond. The fourth box is made of [illegible] pieces of board [illegible] in front.
The two end pieces which open by hinges are fastened to the back [illegible] and
to the third box by a hinge [illegible] or clasp. The pressing [illegible] is fastened
to the follower by hinges and clasps so as to swing when it is in the way
of putting in cotton or other bale goods. The three upper boxes have several
staples fastened or fitted into them entering into each other in such a
manner as to keep them steady. The whole Racks, Nuts, Spindles, Shafts
Boxes &c &c may be made of wrought, cast iron or wood &c &c
The above described machinery may be worked by ^water^ Man, Horse or any other power [illegible]

Witnesses { Stephen [illegible]
{ Christopher [illegible]

[illegible] Miller.

[illegible]